US008881220B2

(12) United States Patent
Arya et al.

(10) Patent No.: US 8,881,220 B2
(45) Date of Patent: Nov. 4, 2014

(54) MANAGED VIDEO SERVICES AT EDGE-OF-THE-NETWORK

(75) Inventors: Vijay Arya, Bangalore (IN); Malolan Chetlur, Bangalore (IN); Partha Dutta, Bangalore (IN); Shivkumar Kalyanaraman, Bangalore (IN); Anand Seetharam, Amherst, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/596,960

(22) Filed: Aug. 28, 2012

(65) Prior Publication Data

US 2012/0324524 A1      Dec. 20, 2012

Related U.S. Application Data

(63) Continuation of application No. 13/015,149, filed on Jan. 27, 2011.

(51) Int. Cl.
*H04N 7/173*       (2011.01)
*H04N 21/2365*     (2011.01)
*H04N 21/414*      (2011.01)
*H04N 21/24*       (2011.01)

(52) U.S. Cl.
CPC ..... *H04N 21/41407* (2013.01); *H04N 21/2365* (2013.01); *H04N 21/2401* (2013.01)
USPC .............. 725/118; 725/96; 725/121

(58) Field of Classification Search
CPC .................... H04N 21/2401; H04N 19/00193; H04N 7/26186; H04N 7/3038
USPC ........................................... 725/118, 96, 121
See application file for complete search history.

(56) References Cited

U.S. PATENT DOCUMENTS

| | | | | |
|---|---|---|---|---|
| 5,812,930 A * | 9/1998 | Zavrel | ............................. | 725/62 |
| 5,872,784 A * | 2/1999 | Rostoker et al. | ......... | 370/395.64 |
| 6,128,435 A * | 10/2000 | Galton | .......................... | 386/241 |
| 6,876,852 B1* | 4/2005 | Li et al. | ........................ | 455/426.2 |
| 6,920,148 B1* | 7/2005 | Kato | .......................... | 370/442 |
| 6,996,061 B2* | 2/2006 | Yang et al. | .................... | 370/233 |
| 7,187,665 B2* | 3/2007 | Nakamura | .................... | 370/329 |
| 7,616,565 B2* | 11/2009 | Park et al. | ..................... | 370/230 |
| 8,219,134 B2* | 7/2012 | Maharajh et al. | ............. | 455/519 |
| 8,265,019 B2* | 9/2012 | Madan et al. | ................. | 370/329 |
| 8,478,331 B1* | 7/2013 | Rogers et al. | .............. | 455/550.1 |
| 2002/0041566 A1* | 4/2002 | Yang et al. | .................... | 370/229 |
| 2003/0026286 A1* | 2/2003 | Nakamura | .................... | 370/442 |
| 2003/0093530 A1* | 5/2003 | Syed | ............................. | 709/226 |
| 2003/0135632 A1* | 7/2003 | Vrzic et al. | ................... | 709/231 |
| 2006/0221991 A1* | 10/2006 | Bi et al. | ........................ | 370/428 |
| 2006/0227796 A1* | 10/2006 | Wei et al. | ....................... | 370/412 |
| 2007/0201365 A1* | 8/2007 | Skoog et al. | ............... | 370/230.1 |
| 2008/0089406 A1* | 4/2008 | Fukuhara et al. | ......... | 375/240.01 |
| 2008/0134258 A1* | 6/2008 | Goose et al. | .................... | 725/91 |
| 2008/0170630 A1* | 7/2008 | Falik et al. | ............... | 375/240.29 |
| 2008/0205431 A1* | 8/2008 | Park et al. | ..................... | 370/458 |
| 2008/0310516 A1* | 12/2008 | Kobayashi et al. | ...... | 375/240.24 |
| 2009/0154387 A1* | 6/2009 | Rogers | .......................... | 370/312 |

(Continued)

*Primary Examiner* — Nasser Goddarzi
*Assistant Examiner* — Michael B Pierorazio
(74) *Attorney, Agent, or Firm* — Ference & Associates LLC (57) ABSTRACT

Systems and methods for managing video delivery to mobile device clients. Videos are assimilated for transmission to clients, a playout lead is estimated for each video and the videos are transmitted to the clients.

7 Claims, 7 Drawing Sheets

(56) References Cited

U.S. PATENT DOCUMENTS

| | | | |
|---|---|---|---|
| 2009/0157891 A1* | 6/2009 | Hughes | 709/231 |
| 2009/0181616 A1* | 7/2009 | Hodson et al. | 455/12.1 |
| 2009/0254657 A1* | 10/2009 | Melnyk et al. | 709/224 |
| 2009/0268655 A1* | 10/2009 | Bertz et al. | 370/312 |
| 2010/0077095 A1* | 3/2010 | Wong et al. | 709/231 |
| 2010/0333148 A1* | 12/2010 | Musha et al. | 725/81 |
| 2011/0047285 A1* | 2/2011 | Kampmann et al. | 709/231 |
| 2011/0082924 A1* | 4/2011 | Gopalakrishnan | 709/223 |
| 2011/0082946 A1* | 4/2011 | Gopalakrishnan | 709/231 |
| 2011/0096828 A1* | 4/2011 | Chen et al. | 375/240.02 |
| 2011/0222400 A1* | 9/2011 | Skoog et al. | 370/230 |
| 2011/0239078 A1* | 9/2011 | Luby et al. | 714/752 |
| 2011/0305266 A1* | 12/2011 | Samad et al. | 375/224 |
| 2012/0096508 A1* | 4/2012 | Kim et al. | 725/118 |
| 2012/0165015 A1* | 6/2012 | Gupta et al. | 455/436 |
| 2012/0176551 A1* | 7/2012 | Matsuura et al. | 348/726 |
| 2012/0208512 A1* | 8/2012 | Maharajh et al. | 455/414.1 |
| 2012/0275372 A1* | 11/2012 | Bertz et al. | 370/312 |
| 2013/0064527 A1* | 3/2013 | Maharajh et al. | 386/343 |
| 2013/0166580 A1* | 6/2013 | Maharajh et al. | 707/758 |
| 2013/0219446 A1* | 8/2013 | Hefeeda et al. | 725/116 |

\* cited by examiner

MANAGED VIDEO SERVICES AT EDGE-OF-THE-NETWORK

CROSS REFERENCE TO RELATED APPLICATION

This application is a continuation of U.S. patent application Ser. No. 13/015,149, entitled SYSTEMS AND METHODS FOR MANAGED VIDEO SERVICES AT EDGE-OF-THE-NETWORK, filed on Jan. 27, 2011, which is incorporated by reference in its entirety.

BACKGROUND

Generally, the number of mobile video service users has been rapidly increasing over time. Compressed videos typically have a variable bit rate (VBR), and video servers at edge-of-the-network normally are confronted with multiplexing a large number of VBR videos. This requires multiplexing of VBR videos at the server, which can present logistical challenges and problems with the efficient delivery of videos to individual mobile phones or other devices receiving the videos.

BRIEF SUMMARY

In summary, one aspect of the invention provides a method comprising: assimilating videos for transmission to clients; estimating playout lead for each video; and transmitting the videos to the clients.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
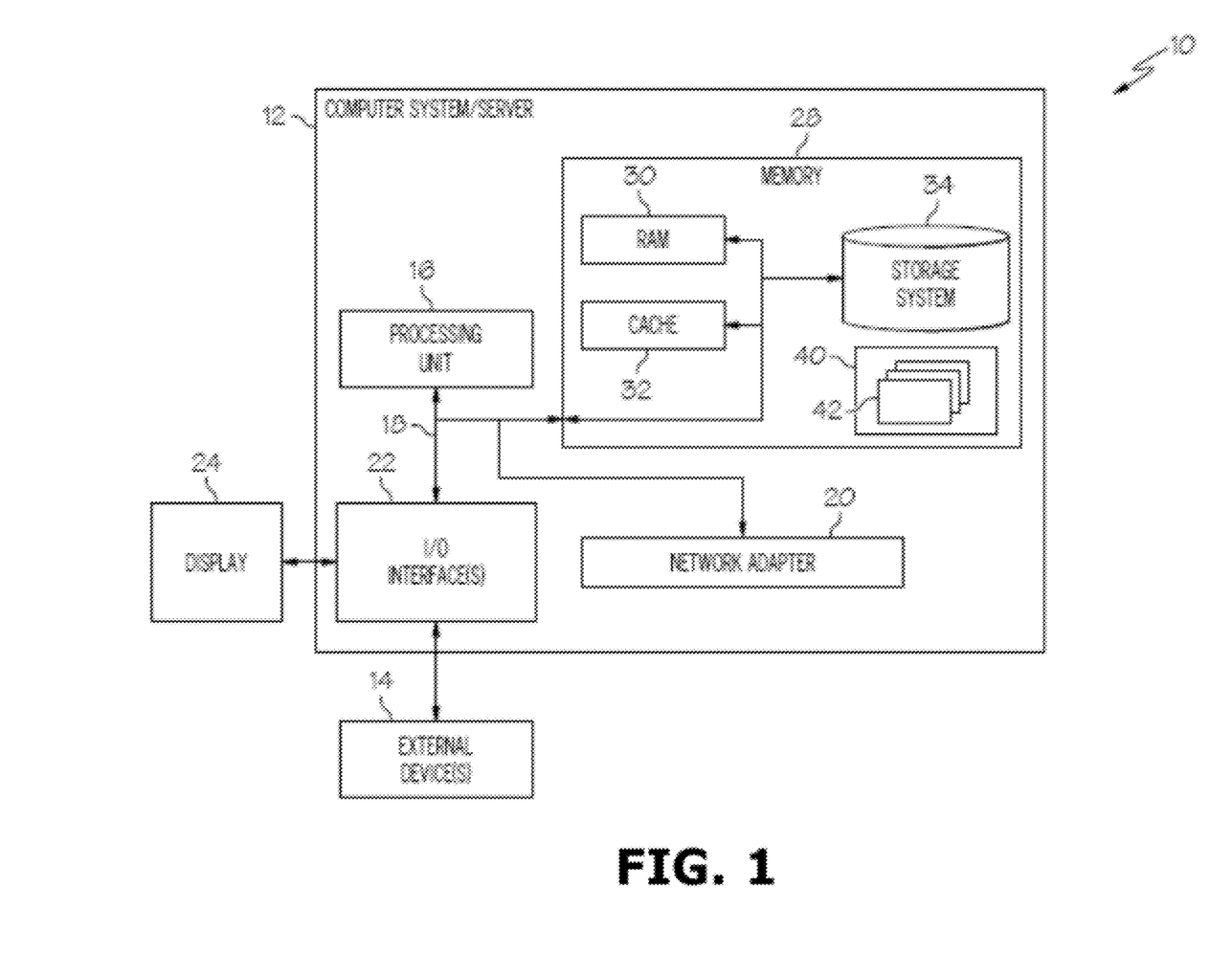
FIG. 1 illustrates a computer system.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-6 can be performed or utilized by way of a processing unit or units and system memory such as those indicated, respectively, at 16 and 28 in FIG. 1, whether on a server computer, a client computer, a node computer in a distributed network, or any combination thereof.

Generally, there are broadly contemplated herein, in accordance with at least one embodiment of the invention, systems and methods for managing the experience of a group of VBR videos by using stalls (or stalling times) as a quality metric. The lead time of a video, in particular, is employed to manage stalls fairly and equitably across a number of videos. Arrangements such as these can be employed in wired and wireless channels alike.

Figure 2:
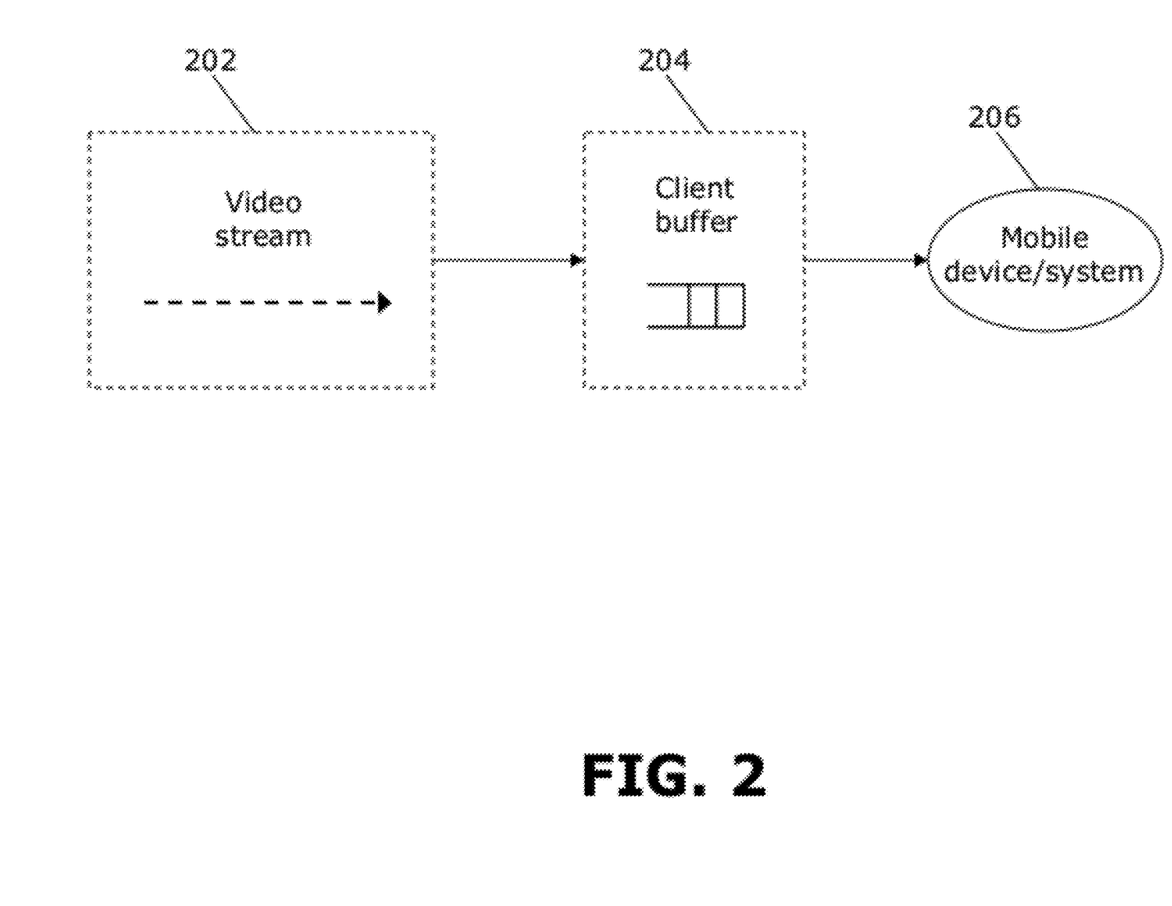
FIG. 2 schematically illustrates basic elements in delivering video to mobile devices.

By way of background in accordance with at least one embodiment of the invention, n videos (v_1, . . . , v_n) are streamed to n clients from the video server which contains the video objects. In as much as a video is a sequence of frames, the frames are then played-out at a constant rate but can widely vary in size (as measured in bits). Normally, each frame has an associated display time; if a frame is received before its display time, it is played, otherwise the video playout stalls. FIG. 2 schematically illustrates basic elements in delivering video to mobile devices. As shown, a video stream 202 is delivered (usually from a video server) to a client buffer 204 at or associated with a client itself, here indicated as a mobile device/system 206. The function of a client buffer 204 will be better understood herebelow.

Figure 3:
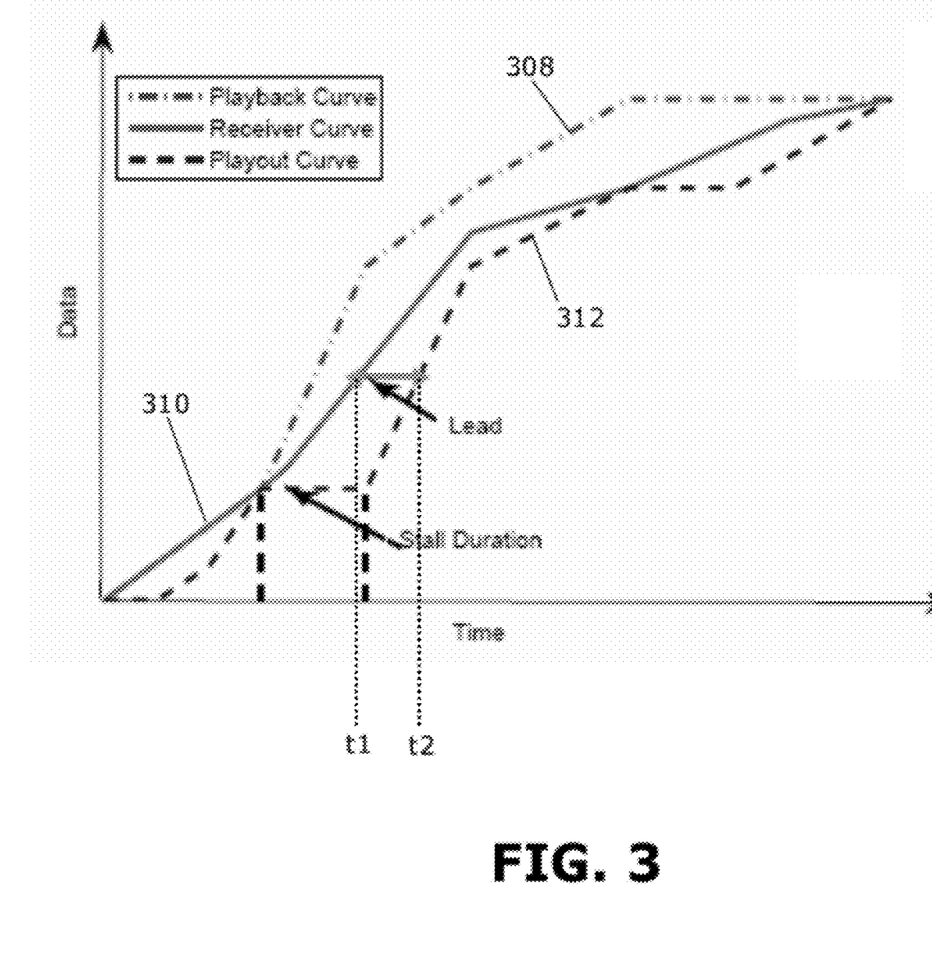
FIG. 3 graphically illustrates concepts of lead time and stall duration in the context of video delivery to mobile devices.

By way of further background in accordance with at least one embodiment of the invention, FIG. 3 graphically illustrates concepts of lead time and stall duration in the context of video delivery to mobile devices. The playback curve p(t) of a video (308) specifies the cumulative data requirement of the video by time t from the start of video play. The receiver curve 310 represents the amount of data received by a client and the playout curve 312 represents the actual amount of data played. A client buffer (see FIG. 2, 202) contains the frames that have been received but not yet displayed. As shown, the frames may be stalled at the client for a given stall duration, inasmuch as no additional data is played out to the client. A buffering scheme at the client thus determines when to restart playout after a stall. The playout lead of a video ("Lead"

in FIG. 3) represents the amount of time that a client can play out its buffer without receiving additional data at the client.

Figure 4:
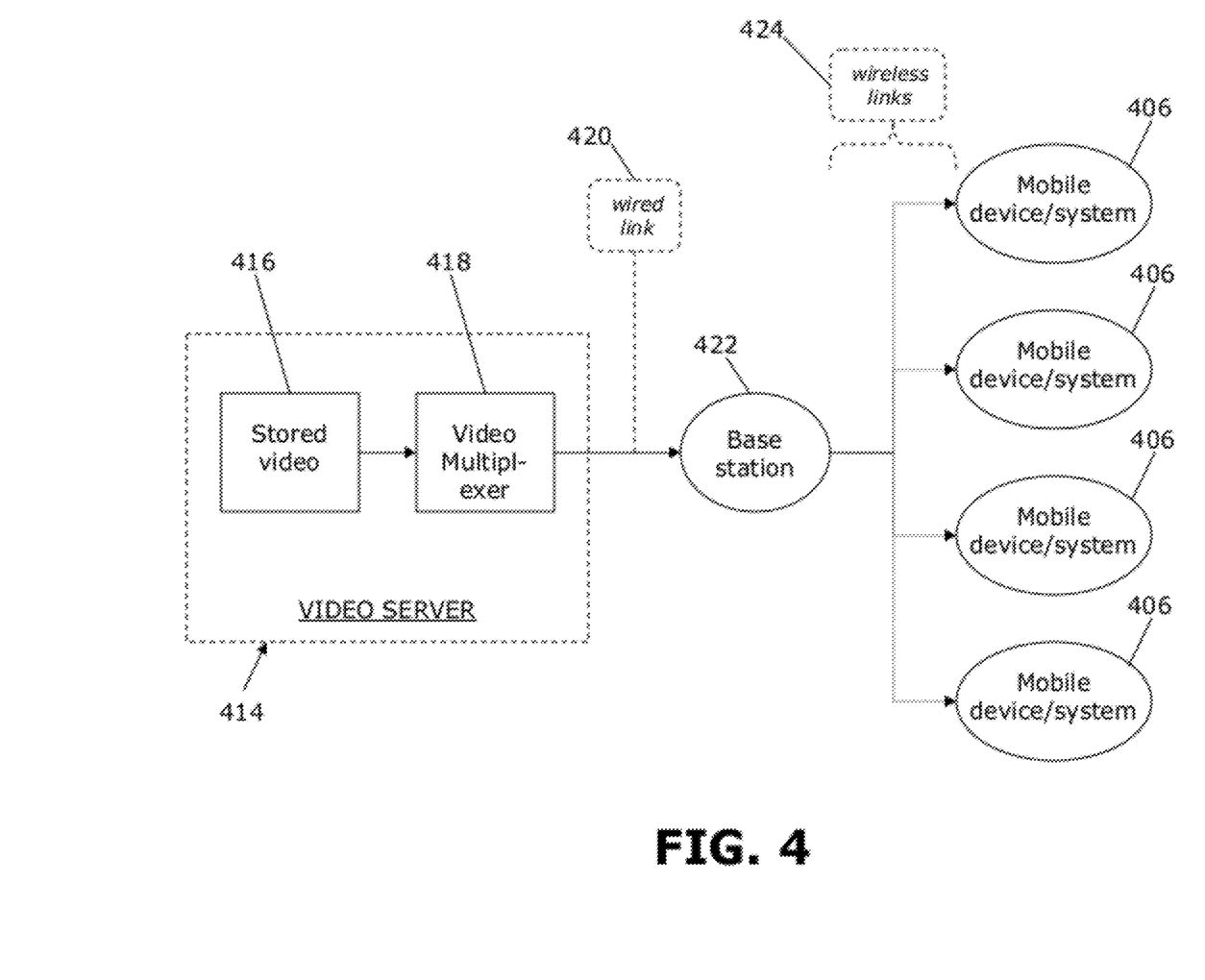
FIG. 4 schematically illustrates a basic setup for delivering video to multiple mobile device clients.

In accordance with at least one embodiment of the invention, FIG. 4 schematically illustrates a basic setup for delivering video to multiple clients. As shown, a video server 416 includes stored video and a video multiplexer 418 that functions in a manner to be described herebelow. A wired link 420 can connect the video multiplexer 418 with a base station 422, itself configured to transmit data over wireless links 424 to clients 406 (here noted as mobile devices/systems). Video multiplexer 418 continuously estimates the lead of each video, expressed by (S−P)/F, where S is the number of frames sent to a client 406, P is number of frames played out by the client and F represents the number of frames played per second. While F is constant for a video and known at the server 414, S depends on the multiplexing scheme and is determined by the server 414 (at video multiplexer 418). Further, P depends on the buffering scheme of a client 406 and the nature of the links (e.g., wired 420 and/or wireless 424) to the clients 406.

Figure 5:
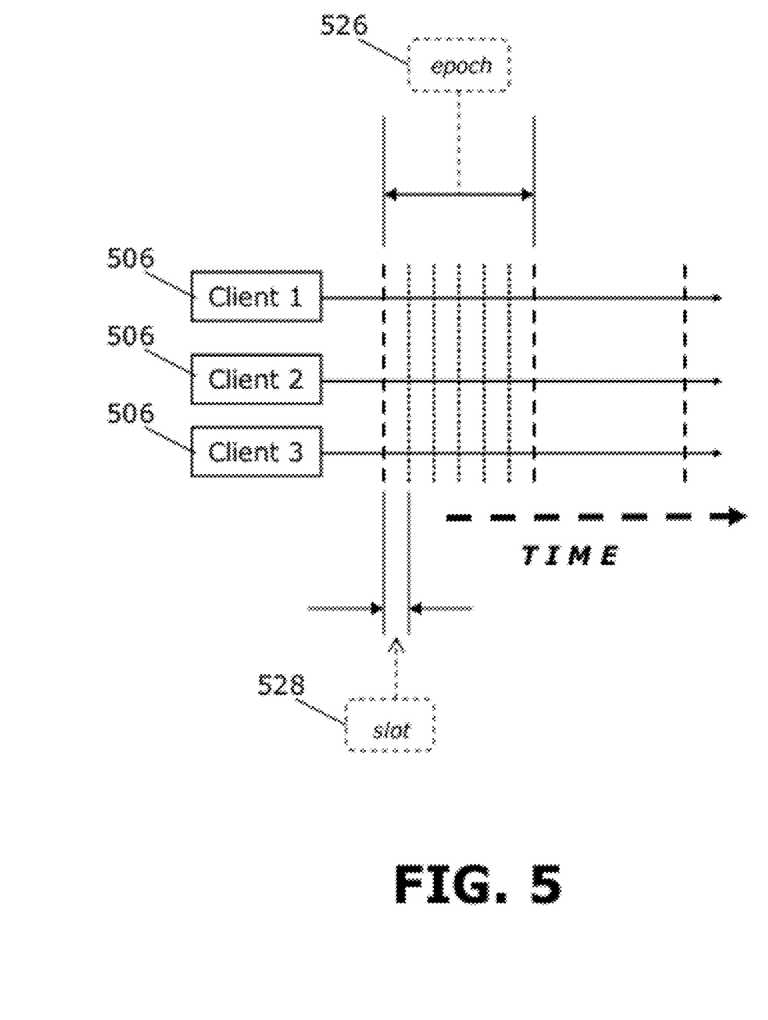
FIG. 5 graphically illustrates some timing concepts governing video delivery.

In accordance with at least one embodiment of the invention, FIG. 5 graphically illustrates some timing concepts governing video delivery. Illustrated is a progressive time scale as experienced at each of three illustrative clients (e.g., mobile devices/systems) 506. An "epoch" 526 is defined as a fixed duration of time. Further, an epoch 526 is divided into slots 528. In a slot 528, data can be sent to at most one client 506; this concept will be more readily appreciated from further discussion herebelow.

Figure 6:
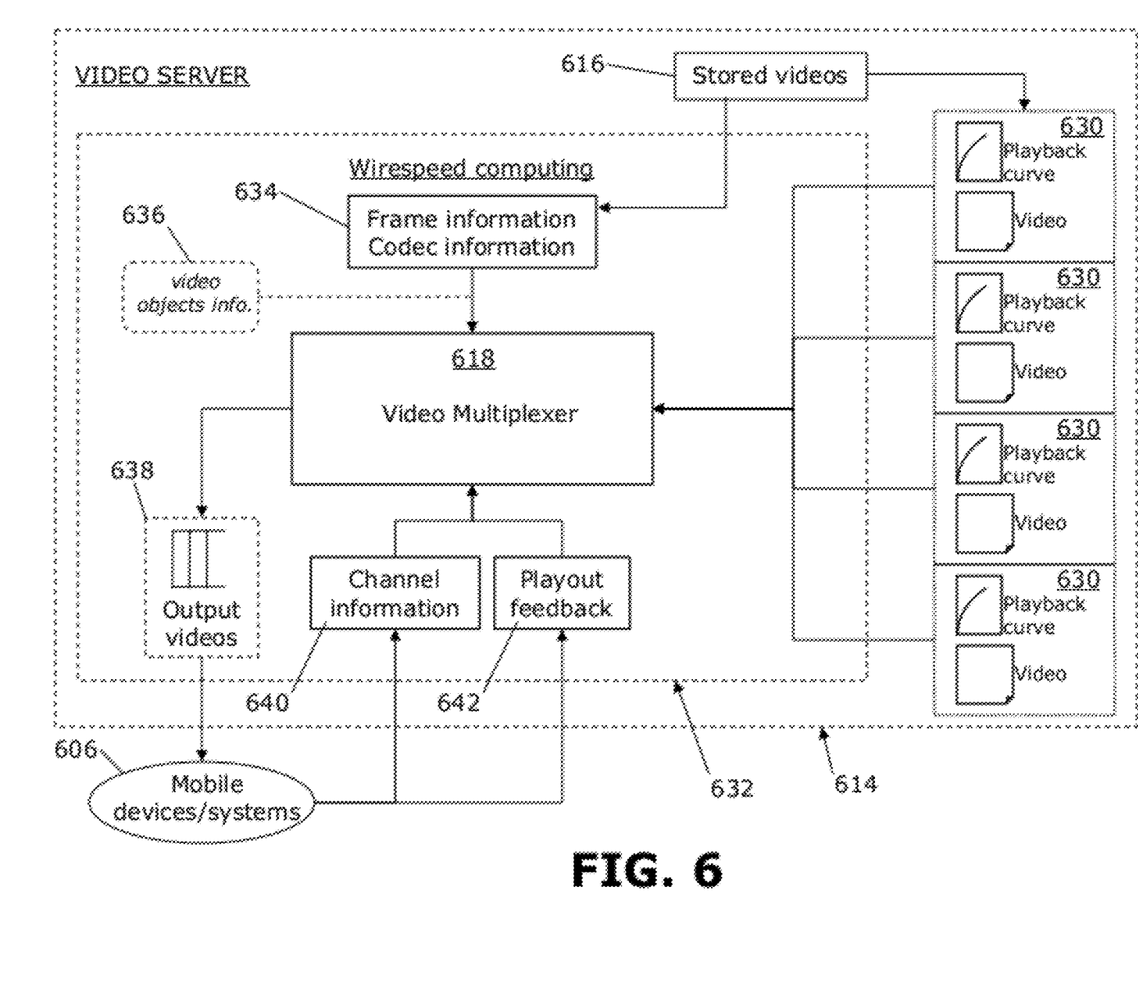
FIG. 6 schematically illustrates a system architecture for delivering video to mobile device clients.

In accordance with at least one embodiment of the invention, FIG. 6 schematically illustrates a system architecture for delivering video to clients (e.g., mobile systems and devices) 606. As shown, video server 614 includes stored videos 616. From these, input videos 630, each including a video and a playback curve, are delivered to a wirespeed computing module which includes a video multiplexer 618. Information about the video frames (e.g., frame type and frame priority) and the codec used for encoding the input videos 630 is obtained from the stored videos 616, and is provided as video object information 636 directly to the video multiplexer 618 as well. Based on a video multiplexing scheme as discussed more fully below, output videos 638 are delivered to the clients 606; particularly, the output videos 638 each contain an estimation of P, or the number of frames played out by a client 606. Essentially, based on P and S, the amount of playout-lead is estimated. A feedback from the client on the playout lead information can also be used in the video multiplexing scheme. The video with the least amount of playout lead is chosen for the transmission in the immediate slots.

In accordance with at least one embodiment of the invention, the tasks of estimating P and multiplexing at video multiplexer 618 are performed epoch-by-epoch. One-time application layer feedback 642 from the clients 606 can assist video multiplexer 618 in performing the estimation of P, or P can be set to a predetermined time period representing a tolerable stall duration in video streaming (e.g., 10-15 seconds).

In accordance with at least one embodiment of the invention, the server 614 assumes a simple client buffering scheme. If a client 606 receives sufficient frames to play until the end of an epoch, then the frames play out during the epoch or otherwise the video play stalls for the entire epoch. Clients 606 may follow another buffering scheme or a different stall duration. The number of played-out frames also depends on the bit-rate of the (wired and/or wireless) link to the clients 606. For a wired backhaul link, the bit-rate is constant and known while for a wireless link, the bit-rate varies with time, along with the channel quality of the clients. The wireless bit-rate can be estimated from channel quality information from Base Station (BS) or client, and can be available in broadband wireless networks, e.g., in WiMAX.

As mentioned hereinabove with regard to FIG. 5, in accordance with at least one embodiment of the invention, an epoch is divided into slots. In a slot, data can be sent to at most one client 606. video multiplexer 618 estimates the number of bits per slot for each client 606 from the channel quality information 640 returned from a client 606.

In accordance with at least one embodiment of the invention, using channel bit rates, video multiplexer 618 multiplexes a video in such a way that in an epoch: the number of frames sent to a client 606 (S) is the same as the number of frames received by that client 606 (R), the stalls are fairly distributed across clients 606 (i.e., the minimum lead time across all users is maximized) and number of frames played out by a client 606 (P) is estimated from R by calculating the number of played out frames according to the buffering scheme.

By way of an illustrative and non-restrictive example of execution, in accordance with at least one embodiment of the invention, multiplexing of videos is performed epoch-by-epoch at video multiplexer 618, where epoch duration=D. The playout lead for each video is computed at the end of previous epoch. For a wired link with total constant bit rate=C, While usedBits<C. D. The video v with the lowest lead is selected, and enough bits b for the next frame of v are allocated. The lead of v is increased, and the number of used bits is increased by b.

Also, in an illustrative and non-restrictive example of execution in accordance with at least one embodiment of the invention, for a wireless link, SlotSet is the set of all wireless slots in the epoch and While SlotSet is not empty. The video v with the lowest lead is selected, and the slot s in SlotSet with the highest number of bits per slot for v is selected. Slot s is allocated to v, the lead of v is increased and s is removed from SlotSet.

Figure 7:
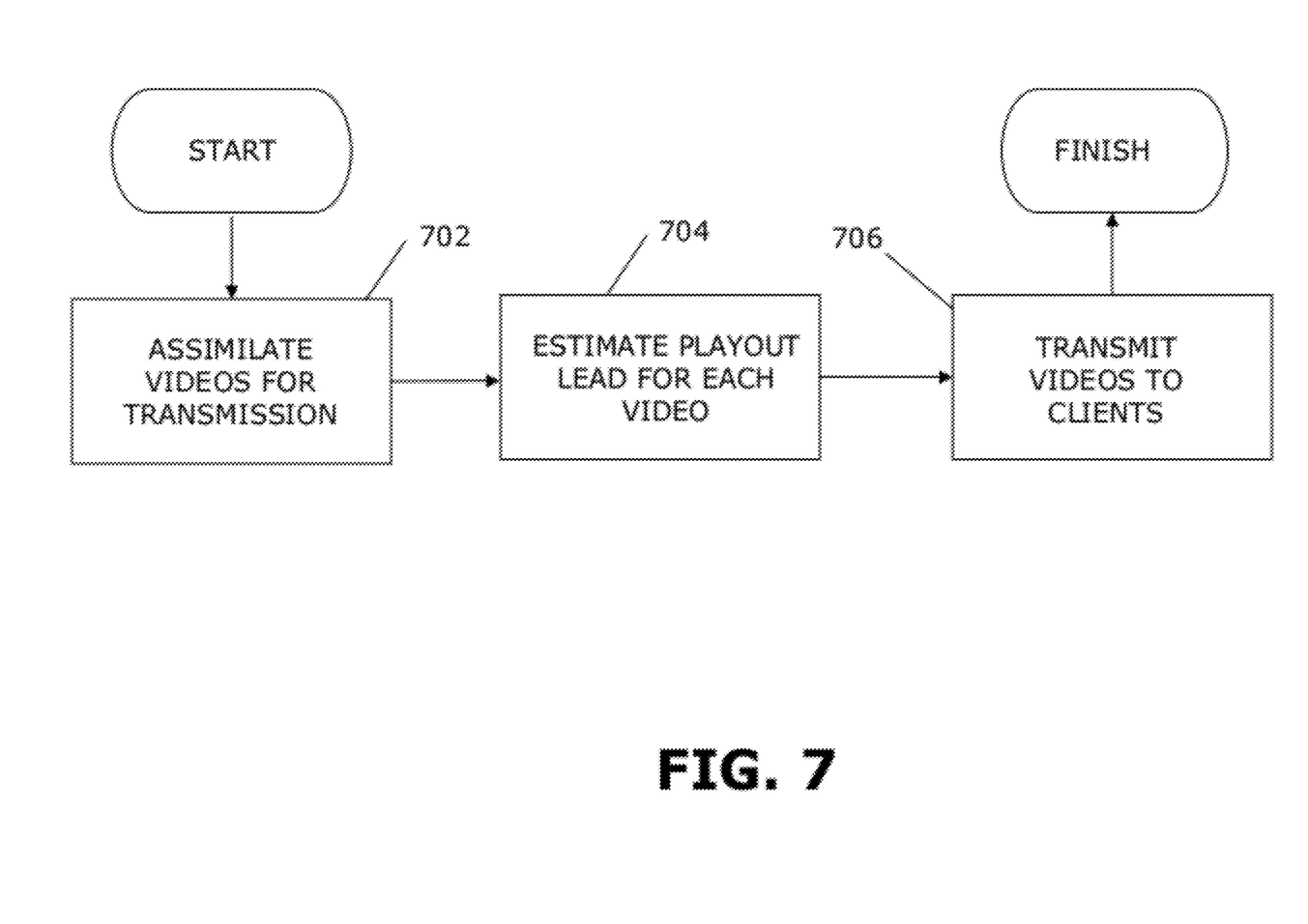
FIG. 7 sets forth a process more generally for managing video delivery to mobile devices.

FIG. 7 sets forth a process more generally for managing video delivery to mobile devices, in accordance with at least one embodiment of the invention. It should be appreciated that a process such as that broadly illustrated in FIG. 7 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 7 can be performed by way a processing unit or units and system memory such as those indicated, respectively, at 16 and 28 in FIG. 1.

As shown in FIG. 7, videos are assimilated for transmission to clients (702). A playout lead is estimated for each video (704) and the videos are transmitted to the clients (706).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    assimilating videos at a video multiplexer for separate transmission to a plurality of mobile clients in communication with a base station in a broadband wireless network or wireless wide area network;
    estimating playout lead for each video, the playout lead comprising time for a corresponding one of the mobile clients to play out a client buffer without receiving additional data at the corresponding one of the mobile clients;
    wherein said estimating comprises determining a number of video frames to be played out by the corresponding one of the mobile clients, via employing an epoch-by-epoch client buffering scheme, each epoch comprising a fixed duration of time;
    said employing comprising using a playout lead determined in a previous epoch; and
    transmitting the videos from the video multiplexer to the plurality of mobile clients based on the estimated playout lead.

2. The method according to claim 1, wherein said estimating comprises determining a number of video frames to be sent to the corresponding one of the mobile clients.

3. The method according to claim 1, wherein said employing comprises obtaining feedback from the corresponding one of the mobile clients.

4. The method according to claim 1, wherein said transmitting further comprises:
    selecting a video with a lowest playout lead;
    allocating sufficient bits to transmit a subsequent frame of the selected video; and
    increasing the playout lead of the selected video.

5. The method according to claim 1, wherein said transmitting comprises transmitting over a wireless link.

6. The method according to claim 5, wherein said transmitting further comprises dividing an epoch into slots.

7. The method according to claim 6, wherein said transmitting further comprises:
   selecting a video with a lowest playout lead;
   selecting a slot with a highest number of bits per slot for the selected video;
   allocating the selected slot to the selected video; and
   increasing the playout lead of the selected video.

* * * * *